(12) United States Patent
Ashmead et al.

(10) Patent No.: US 6,387,200 B1
(45) Date of Patent: May 14, 2002

(54) SACRIFICIAL ENERGY ABSORBING STRUCTURE

(75) Inventors: Michael Ashmead, Woodhurst (GB);
Paul Blauberger, Munich (DE);
Werner Lehr, Germering (DE); Ralf Passman, Liclnzach (DE)

(73) Assignee: Cellbond Composites Limited, Huntingdon (GB)

( * ) Notice: Subject to any disclaimer, the term of this patent is extended or adjusted under 35 U.S.C. 154(b) by 0 days.

(21) Appl. No.: 09/230,811

(22) PCT Filed: Aug. 12, 1997

(86) PCT No.: PCT/GB97/02174

§ 371 Date: Aug. 23, 1999

§ 102(e) Date: Aug. 23, 1999

(87) PCT Pub. No.: WO98/06553

PCT Pub. Date: Feb. 19, 1998

(30) Foreign Application Priority Data

Aug. 14, 1996 (GB) .............................. 9617077
May 31, 1997 (GB) .............................. 9711159

(51) Int. Cl.⁷ .............................. B32B 5/18; B32B 31/14
(52) U.S. Cl. .............................. 156/79; 156/78; 156/242; 264/45.1; 264/45.5; 264/46.6; 264/45.6; 264/319; 428/117
(58) Field of Search .............................. 428/117, 593, 428/116, 304.4, 71, 73, 74; 156/79, 78, 77, 245, 242; 264/46.6, 321, 45.5, 45.6, 125, 319

(56) References Cited

U.S. PATENT DOCUMENTS

| | | | |
|---|---|---|---|
| 4,687,591 A | * | 8/1987 | Kay |
| 5,188,879 A | * | 2/1993 | Hill et al. |
| 5,338,594 A | * | 8/1994 | Wang et al. |
| 5,804,030 A | * | 9/1998 | Jaegers et al. |

FOREIGN PATENT DOCUMENTS

| | | | |
|---|---|---|---|
| EP | 0 008 960 A2 | | 3/1980 |
| EP | 0 314 442 A2 | | 5/1989 |
| EP | 794442 | * | 9/1997 |
| FR | 1478481 | * | 3/1967 |
| GB | 1 492 752 | | 11/1977 |
| GB | 2 083 162 A | | 3/1982 |
| JP | 01171935 | | 7/1989 |
| JP | 05058349 | | 3/1993 |
| JP | 06211161 | | 8/1994 |

* cited by examiner

Primary Examiner—Deborah Jones
Assistant Examiner—Wendy Boss
(74) Attorney, Agent, or Firm—Sheridan Ross P.C.

(57) ABSTRACT

The invention thus provides a method of making a foam-filled composite matrix having a cellular core, and the composite matrix of the method, e.g. for use as sacrificial energy absorbing structures particularly for the passenger compartments of vehicles, e.g. motor vehicles. Thus the structures may be used in head linings in automobiles and as linings and even seats in vehicles such as aircraft. Additionally the structures may form crash padding in crash helmets and body armour.

12 Claims, 2 Drawing Sheets

SACRIFICIAL ENERGY ABSORBING STRUCTURE

DESCRIPTION

1. Technical Field

The invention relates to sacrificial energy absorbing structures, i.e. crash padding, for use, for example, in vehicles for personal protection and to a method of making such structures. By sacrificial energy absorbing structures is meant structures that are permanently deformed in absorbing impact energy.

2. Background Art

It is known to provide panels consisting of or comprising a cellular matrix, e.g. a honeycomb-like cell structure. It is also known to arrange the cells of such matrices to have axes extending generally perpendicular to the plane of the panel or other article, with the cells being open-ended. Often such cellular matrices are used as a core in a panel and the open ends of the cells are closed by structural skins, e.g. of sheet material, applied to the opposite sides of the core.

It is further known to employ cellular structures, e.g. honeycomb structures made from aluminium foil or sheet for energy absorption, e.g. impact energy absorption. Such structures are efficient energy absorbers but have disadvantages when used in vehicles including high noise transmission characteristics, a propensity to rattle and difficulties in handling. Thus the sharp edges of such honeycomb panels may cause personal injury when making, transporting and installing such structures and the structures are also vulnerable to unintended damage at such times.

It is still further known to attempt to fill cellular matrix panels with a rigid foam material by pressing the foam and panel together such that the cell walls cut into the foam and the foam is forced into the cells. Such a foam filling method is thus necessarily restricted to rigid foams and in the resultant article there is no connection between the foam and cell structure beyond that provided by friction.

It is also known from JP-1-171935 of TOYOTA MOTOR CORP. to form a honeycomb sandwich structure in which a stock liquid of foamable resin is cast into a predetermined part of a honeycomb core and is then allowed to expand to fill the cells of the predetermined part of the core to form a sandwich structure of superior rigidity.

It is an object of the invention to provide a method of making a foam-filled cellular article e.g. for use as sacrificial crash padding.

It is a further object of the invention to provide an improved sacrificial energy absorbing structure.

DISCLOSURE OF INVENTION

From one aspect the invention is a method of making sacrificial energy absorbing structure, e.g. crash padding, comprising the steps of providing a deformable cellular matrix of the kind comprising a plurality of open-ended tubular cells, introducing a resilient foam-producing material into the cells of the matrix, allowing or causing the foam-producing material to foam to fill the cells, and allowing or causing the foam to cure or set to form a resilient foam.

The cellular matrix may be of a honeycomb structure. The cellular matrix may be of a lightweight metal such as aluminium or an aluminium alloy and the cell walls may be made of foil or thin sheet. The cells may be arranged with their central axes extending generally perpendicular to the plane of the sacrificial energy absorbing structure whereby energy absorption is achievable by axial deformation of the cells.

The foam-producing material may be solid, e.g. in the form of beads, or may be liquid. The foam-producing material may be of a nature such that it foams on contact with ambient air at room temperature or may be activated to foam e.g. by the application of heat energy, or may be chemically activated.

The foam-forming material may be introduced individually into the cells, e.g. using a series of injection nozzles or may be poured into the cells. Alternatively the matrix may be dipped into a bath of liquid foam-producing material to cause the liquid to coat the cell walls. The foam-producing material may be injected into the cells at one or more discrete locations spaced over the matrix.

Preferably the method further comprises arranging for the cells to be interconnected e.g. by providing communicating apertures intermediate their ends or by notching the ends of the cells and injecting the foam-producing material at one or more locations. In this way the foam-producing material can be easily dispersed through the cell structure without need for high injection pressures which may tend to damage the cell structure. The apertures may be created by machining a block of cell-forming material before it is expanded to form a honeycomb structure, the apertures being spaced to intersect each cell in the matrix. The apertures may be created by water jet drilling.

The method may comprise overlaying one or both sides of the matrix with a fibrous mat e.g. of polyester fibres such as that sold under the Registered Trade Mark 'DACRON', before injection of liquid foam-producing material into the cells, to form a skin over the ends of the cells consisting of the fibrous mat impregnated with the foam to mask the ends of the cells.

Preferably the nature of the foam material is such that it adheres to the cell walls to form a monolithic structure. Where the cells are interconnected, the foam is also mechanically locked into the cells. The foam is preferably of low density, e.g. in the range 60 to 100 kg/m$^3$ and is preferably around 80 kg/m$^3$.

The method may comprise arranging the cellular matrix in a closed mould before introducing the foam-forming material into the cells.

From another aspect the invention is a foam filled cellular article made by the method described above. In particular the article is a sacrificial energy absorbing structure comprising a honeycomb core of metal foil filled with a low density resilient foam which also forms a skin over the structure, which skin is reinforced with a mat of fine fibres.

BRIEF DESCRIPTION OF DRAWINGS

The invention is diagrammatically illustrated, by way of example, in the accompanying drawings, in which.

BEST MODE FOR CARRYING OUT THE INVENTION

Figure 1:
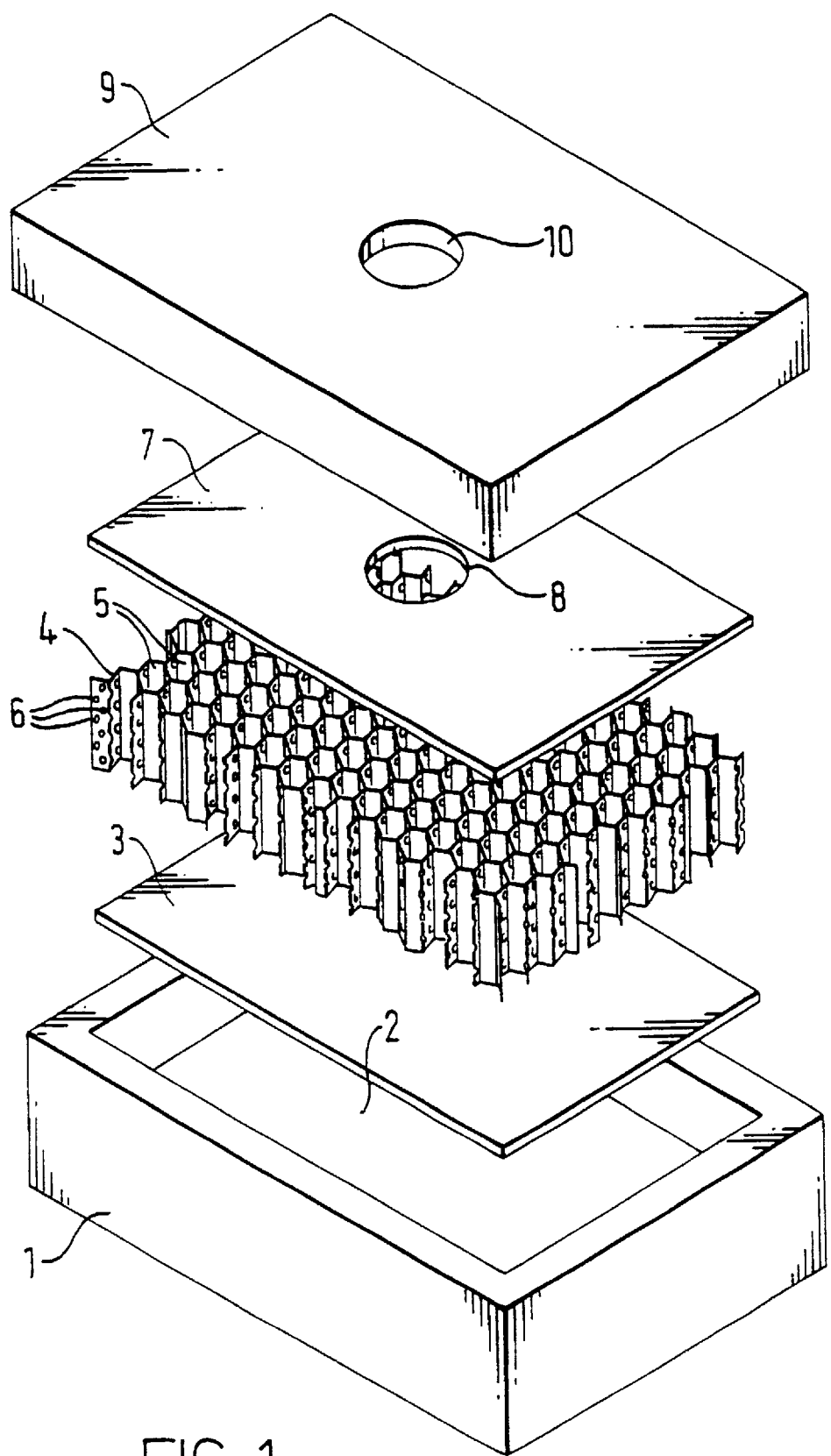
FIG. 1 is an exploded perspective view indicating how the composite matrix may be made.

FIG. 1 illustrates how a sacrificial energy absorbing structure of the present invention may be made. Into the cavity (2) of a mould (1) is placed a first or lower sheet or mat (3) of fibrous material, e.g. that sold under the Trade Name 'Dacron'. A honeycomb cellular matrix member (4) or core, e.g. of aluminium foil, and which has been formed with perforations (6) so that the tubular cells (5) in the member (4) are interconnected is then placed in the mould cavity (2) to overlie the said fibrous sheet (3). A further or upper sheet or mat (7) of fibrous material is then laid over the honeycomb cellular member (4), the upper fibrous sheet (7) having a central hole (8), as indicated, for the purpose appearing hereinafter. The mould cavity is then closed by means of a lid (9). The lid is formed with a central port (10) which aligns with the central hole (8) in the upper fibrous sheet and a liquid resilient foam-forming material is injected into the mould through the port (10) such that the foam-forming material is dispersed through the honeycomb cellular member through the perforations (6) therein such that the foam-forming material is evenly distributed through the cells (5) of the matrix (4). The foam-forming material is then allowed or caused, e.g. by heat, to expand and foam to fill the cells (5) and to impregnate the upper and lower fibrous sheets (3,7), after which the foam is allowed to cure to produce a monolithic structure comprising a foam-filled cellular core skinned on both faces by the foam impregnated fibrous mats. It is possible that the foam-forming material might be injected through the sheet (7) without forming a hole (10) therein.

Figure 2:
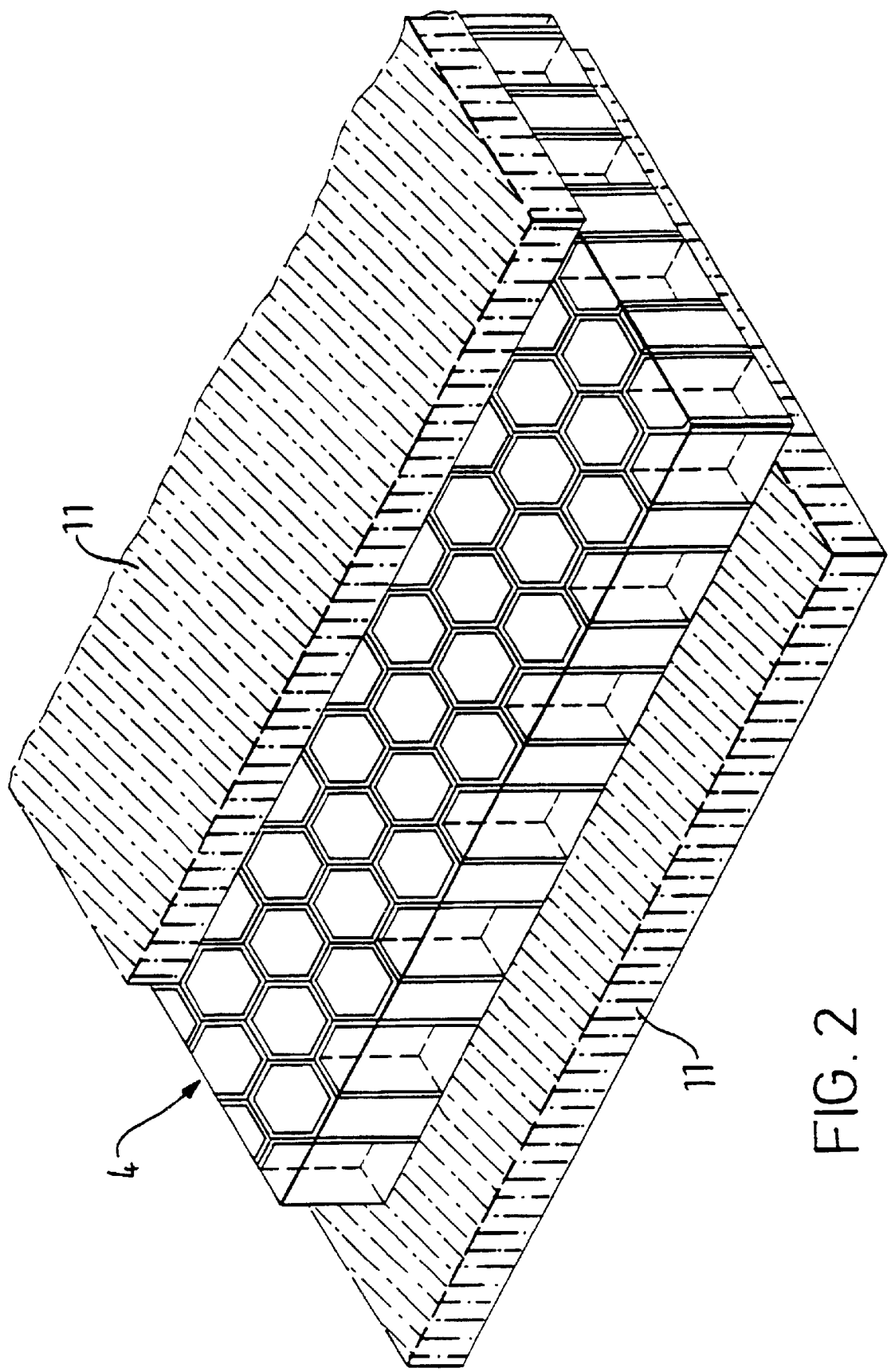
FIG. 2 is a perspective view of a composite matrix in accordance with the invention.

Such a composite structure is shown diagrammatically in FIG. 2 in which the core (4) has been formed on opposite sides with a skin (11) of the resilient material, e.g. foamed polyurethane which encloses and masks the fibrous reinforcement (3,7) so that it cannot be seen.

Although in FIGS. 1 and 2 the honeycomb member (4) is shown as rectangular, it will in practice normally be profiled to suit a particular application. Also the fibrous sheets (3,7) will normally wrap completely round the member (4) so that it is completely enclosed. Thus the skinning of resilient foam may extend over the whole of the structure including its edges.

The resilient foam in the cells and forming the skin is preferably a polyurethane material of low density so that its crushing pressure is around 3 psi. The low density is important to ensure that the foam does not significantly contribute to the overall energy absorbing capability of the structure, although the very presence of the foam will, of course, prevent the honeycomb cells from crushing completely. The preferred foam is formed from two components which, when mixed, initiate a chemical reaction. The curing process of the preferred foam therefore takes place at room temperature. One purpose of the foam is to act as a sound deadening material, in known manner. The foam also increases the bending stiffness of the honeycomb material which facilitates handling of the structure. A high density foam would not be suitable as this would modify the energy absorbing capability of the product.

The two skins are each manufactured from one layer of polyester fibre matting of mass 70 $g/m^2$ whose fibres are very fine and are arranged in a random fashion. The skins are not intended to be structural in any way, nor are they intended to hold the foam within the honeycomb cells. Whereas the foam on its own would not prevent injury through handling, since the aluminium foil forming the honeycomb core will cut through the foam, the skins are not normally cut by the foil through rough handling. The use of structural skins would not be suitable for the structure as they would contribute detrimentally to the product strength.

The honeycomb core is manufactured from an aluminium alloy which has a cell diameter of ¾ inch (19 mm). The nominal crush strength of the honeycomb is 30 psi. This is a standard honeycomb core, although it has holes drilled through its foils (e.g. four per 10 mm) to adjust its energy absorbing capacity and to permit dispersion of the foam throughout the structure as described above. The number and size of the holes can be changed during the manufacturing process in order to modify the energy absorbing characteristics of the honeycomb. The holes may be drilled (e.g. by water jets) through a solid block composed of metal foil before the block is expanded to form the honeycomb structure. A honeycomb material which had solid (i.e. unperforated) foil walls would thus not be suitable for the preferred manufacturing process described above since the foam would then have to be poured directly into-each of the cells.

What is claimed is:

1. A method of making crash padding for use in vehicles for personal protection, said method comprising the steps of providing a deformable cellular matrix comprising a plurality of open-ended tubular cells, providing a fibrous mat over the ends of the cells, introducing into the cells of the matrix a resilient foam-forming material having a lower crush strength than the deformable cellular matrix so as not to contribute significantly to the overall energy-absorbing capability of the crash padding;

allowing or causing the foam-forming material to foam and fill the cells and impregnate the mat, and allowing or causing the foam to cure or set to form a resilient foam.

2. A method according to claim 1 wherein the cellular matrix is of a honeycomb structure.

3. A method according to claim 1, wherein the cellular matrix is of a lightweight metal.

4. A method according to claim 1, comprising arranging the cells with their central axes extending generally parallel to a direction of a forced applied to the cells, whereby energy absorption is achievable by axial deformation of the cells.

5. A method according to claim 1, comprising arranging the cells in the cellular matrix so as to be interconnected by notches or apertures, comprising the step of injecting the foam-forming material into the cells at one or more discrete locations spaced over the matrix, allowing the foam-filling material to disperse through the cell structure through the notches or apertures.

6. A method according to claim 1, comprising creating apertures in the cell walls by machining a block of cell-forming material, and expanding the block to form a honeycomb structure with the apertures being spaced to intersect each cell in the matrix.

7. A method according to claim 6, comprising creating the apertures by water jet drilling.

8. A method according to claim 1, wherein the fibrous mat comprises polyester fibres.

9. A method according to claim 1, wherein the nature of the foam material is chosen to be such that it adheres to the cell walls to form a monolithic structure.

10. A method according to claim 1, wherein the foam is of low density.

11. A method according to claim 10, wherein the foam density is in the range 60 to 100 $kg/m^3$.

12. A method according to claim 1, comprising arranging the cellular matrix in a closed mould before introducing the foam-forming material into the cells.

* * * * *